US006826729B1

(12) United States Patent
Giesen et al.

(10) Patent No.: US 6,826,729 B1
(45) Date of Patent: Nov. 30, 2004

(54) GALLERY USER INTERFACE CONTROLS

(75) Inventors: Ronald Stephen Giesen, Redmond, WA (US); Kenneth Coleman, Kirkland, WA (US); Aaron Weiss, Tucson, AZ (US); Zeke Koch, Seattle, WA (US); Marc Keller, San Jose, CA (US); Howard Cooperstein, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 09/896,384

(22) Filed: Jun. 29, 2001

(51) Int. Cl.[7] ................................................. G09G 5/00
(52) U.S. Cl. ....................... 715/837; 715/841; 715/810; 715/808; 715/809; 715/819
(58) Field of Search ................................. 715/810, 808, 715/809, 819, 837, 841; 345/761, 763, 764, 767, 783, 784, 786, 790, 802, 804, 805, 808, 810, 817–820, 843, 841

(56) References Cited

U.S. PATENT DOCUMENTS

| | | | | |
|---|---|---|---|---|
| 5,500,936 A | * | 3/1996 | Allen et al. .................. | 345/156 |
| 5,734,915 A | * | 3/1998 | Roewer ....................... | 345/775 |
| 5,838,321 A | * | 11/1998 | Wolf ........................... | 345/762 |
| 5,940,078 A | * | 8/1999 | Nagarajayya et al. ....... | 345/859 |
| 6,373,507 B1 | * | 4/2002 | Camara et al. .............. | 345/825 |
| 6,456,304 B1 | * | 9/2002 | Angiulo et al. ............. | 345/779 |
| 6,469,722 B1 | * | 10/2002 | Kinoe et al. ................. | 345/837 |
| 2002/0091739 A1 | * | 7/2002 | Ferlitsch et al. ............ | 707/526 |
| 2002/0122071 A1 | * | 9/2002 | Camara et al. ............. | 345/810 |
| 2003/0206646 A1 | * | 11/2003 | Brackett ...................... | 382/128 |

OTHER PUBLICATIONS

Dwelly, A., "Functions and Dynamic User Interfaces", pp. 371–381 (1989).

Kurtenbach, G. et al., "The Hotbox: Effcient Access to a Large Number of Menu–items", *CHI 99 15–20*, pp. 231–237 (May 1999).

Rich, C. et al., "Adding a Collaborative Agent to Graphical User Interfaces", pp. 21–30 (1996).

Rich, C. et al., "Segmented Interaction History in a Collaborative Interface Agent", pp. 23–30 (1997).

* cited by examiner

*Primary Examiner*—Ba Huynh
*Assistant Examiner*—Mylinh Tran
(74) *Attorney, Agent, or Firm*—Merchant & Gould P.C.

(57) ABSTRACT

A computing system for providing a user interface control to modify properties of items within a main application window. The computing system has a main application window, a gallery control window, a control object selection processing module, and a control object focus processing module. The main application window contains one or more application items, each application item having one or more control properties affecting a behavior of the application item. The gallery control window contains a list of one or more control objects for modifying control properties of the application items located within the main application window. Each of the control objects in the list of control objects includes a graphical icon having a selection portion and a properties portion and one or more control properties that affect one or more items within the main application window.

18 Claims, 10 Drawing Sheets

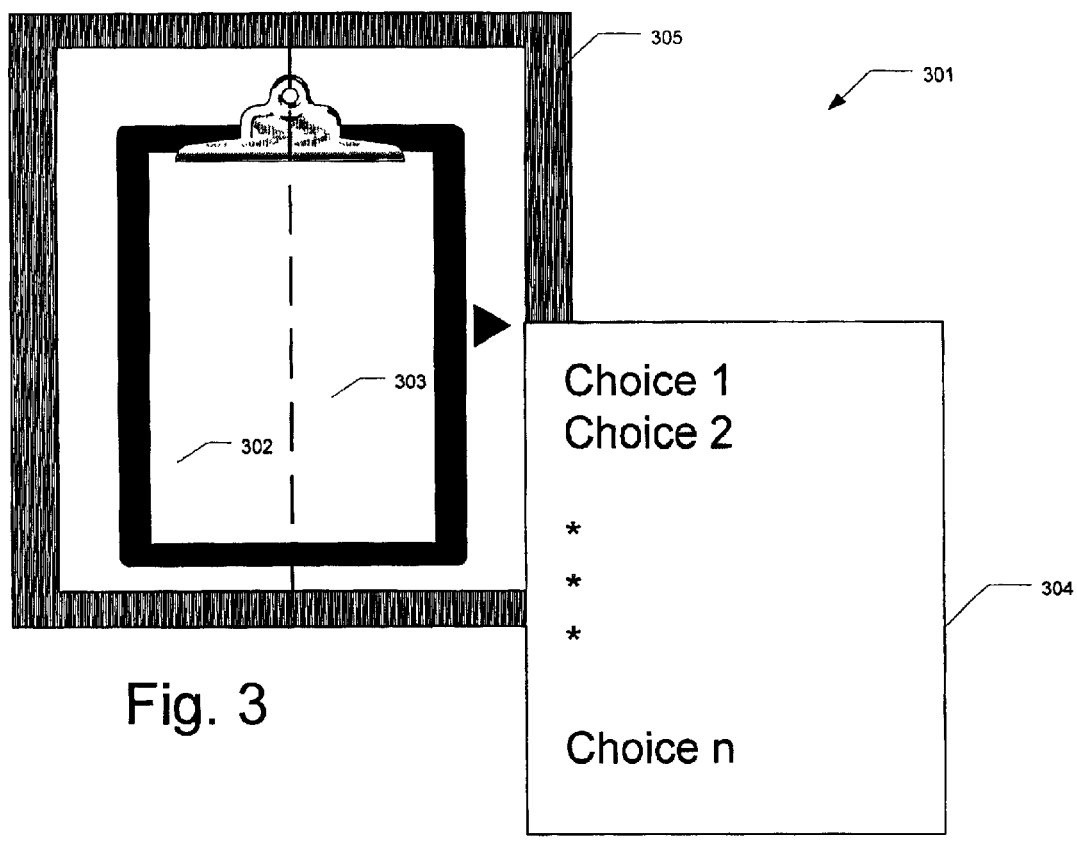
Fig. 3
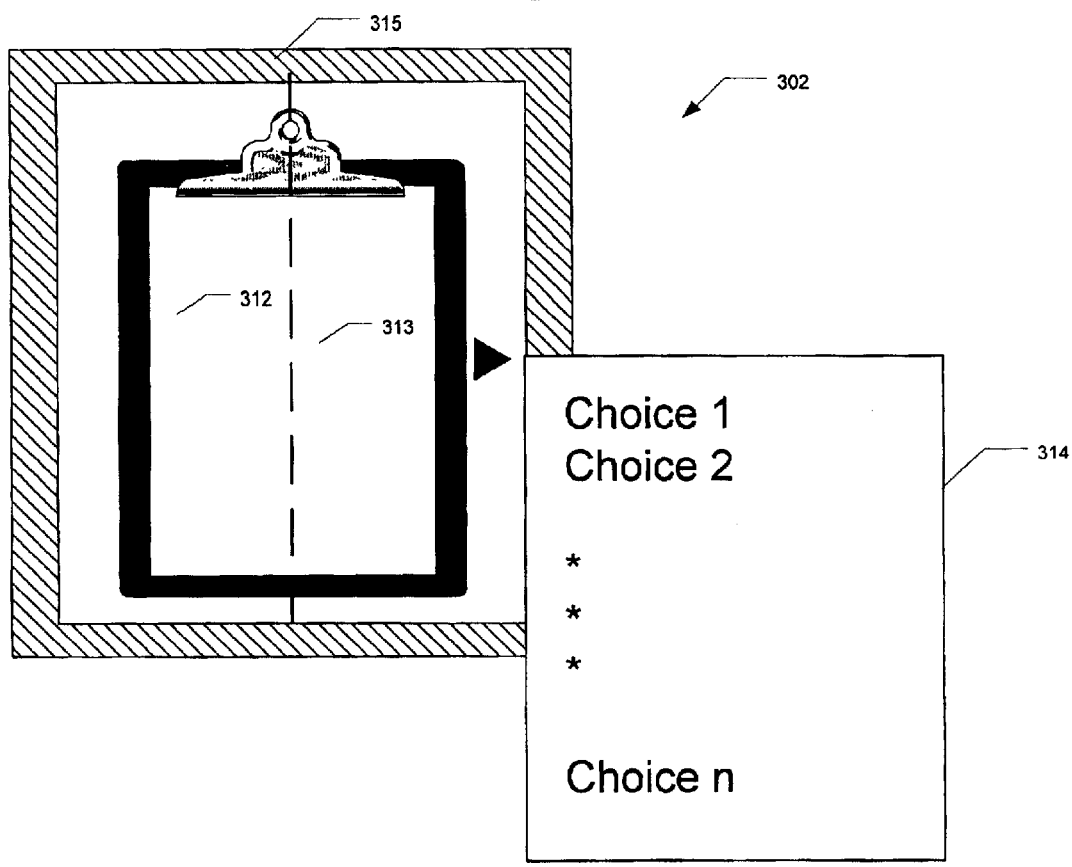

GALLERY USER INTERFACE CONTROLS

TECHNICAL FIELD

This application relates in general to a method, apparatus, and article of manufacture for providing a user interface control for selecting one or more options from a larger set of options, and more particularly to a method, apparatus, and article of manufacture for providing a user interface control for selecting one or more options from a larger set of options where each of the options may have a set of one or more user selectable properties.

BACKGROUND

The increasing capability of computing system has routinely permitted program developers to attempt to add an ever-increasing number of features and options to application programs. Each of these features and options requires a user of the application program to interact with the application program to configure and use these features and options. As such, a user interface control has been needed to present users with a large number of control objects that may be selected. In addition, each of these control objects may individually have properties and settings that a user may wish to manipulate in order to achieve a desired result.

In the past, user interface controls have been constructed using dialog boxes that appeared when a user makes a selection of a control. Typically, a control was selected using function keys, drop-down menus, and right-mouse clicks on an object within a main application window. This selection operation caused a large dialog box or window to be presented to the user in which a control setting or property could be changed. Once a user has made a selection by either clicking upon a setting or highlighting a setting an clicking upon an "OK" or "DONE" button, the dialog box would disappear and the new setting or property would be applied to the appropriate object within the main application window.

This process is not an efficient use of a user's efforts in that a dialog box is presented and removed repeatedly if a user wishes to examine a plurality of possible choices while deciding which setting is actually desired. In addition, many selections themselves possess selectable properties that may need manipulation for a user to arrive at a desired set of properties to achieve the desired result. In the past, these additional properties would be controlled using a second, or settings, dialog boy which is launched using a button located upon the first, or main, dialog box. A user would need to navigate through these multiple levels of dialog boxes and windows to set a control to be active and configured as desired.

With the opening of these dialog boxes, the main application window is typically obscured by the dialog box and the settings dialog box launched from the main dialog box. The screen is redrawn when the various dialog boxes are closed and the new control settings are applied. The above sequence of operations typically breaks the flow of a user as he or she interacts with a main application window which typically maintains the items of interest. The user will need to focus on these controls and dialog boxes, and not the main application window, and when the boxes are gone, refocus upon the main application window and any changes made by the application of the new control settings.

A new user interface control gallery addresses the limitations of the prior design for controls using dialog boxes by providing a user-selectable set of gallery control objects within a separate gallery control window.

SUMMARY

In accordance with the present invention the above and other problems are solved by providing a method, apparatus, and article of manufacture for providing a user interface control for selecting one or more options from larger set of options where each of the options has a set of one or more user selectable properties.

One such aspect of the present invention is a method for providing a user interface control to act on one or more items from a list in a variety of ways. The method renders a list of control objects, each of which comprise a graphical icon having a selection portion and a properties portion and one or more control properties. The method also receives a selection mouse click upon a selection portion of the first control object, and applies the control properties of the first control object.

Another aspect of the present invention is a computing system for providing a user interface control to modify properties of items within a main application window. The computing system has a main application window, a gallery control window, a control object selection processing module, and a control object focus processing module. The main application window contains one or more application items, each application item having one or more control properties affecting a behavior of the application item. The gallery control window contains a list of one or more control objects for modifying control properties of the application items located within the main application window. Each of the control objects in the list of control objects comprise a graphical icon having a selection portion and a properties portion and one or more control properties that affect one or more items within the main application window. The control object selection processing module for modifying one or more application items within the main application window based upon current values of control properties of a selected control object selected using a mouse click located upon a selection portion of the selected control object. The control object focus processing module for modifying current values of control properties of a focus control object identified using a mouse click located upon a properties portion of the focus control object.

These and various other features as well as advantages, which characterize the present invention, will be apparent from a reading of the following detailed description and a review of the associated drawings.

BRIEF DESCRIPTION OF THE DRAWINGS

Referring now to the drawings in which like reference numbers represent corresponding parts throughout:

FIG. 3 illustrates a pair of gallery control objects having a focus property and having a selection property according to another embodiment of the present invention.

DETAILED DESCRIPTION

This application relates in general to a method, apparatus, and article of manufacture for providing a user interface control for selecting one or more options from a larger set of options having user selectable properties.

Figure 1:
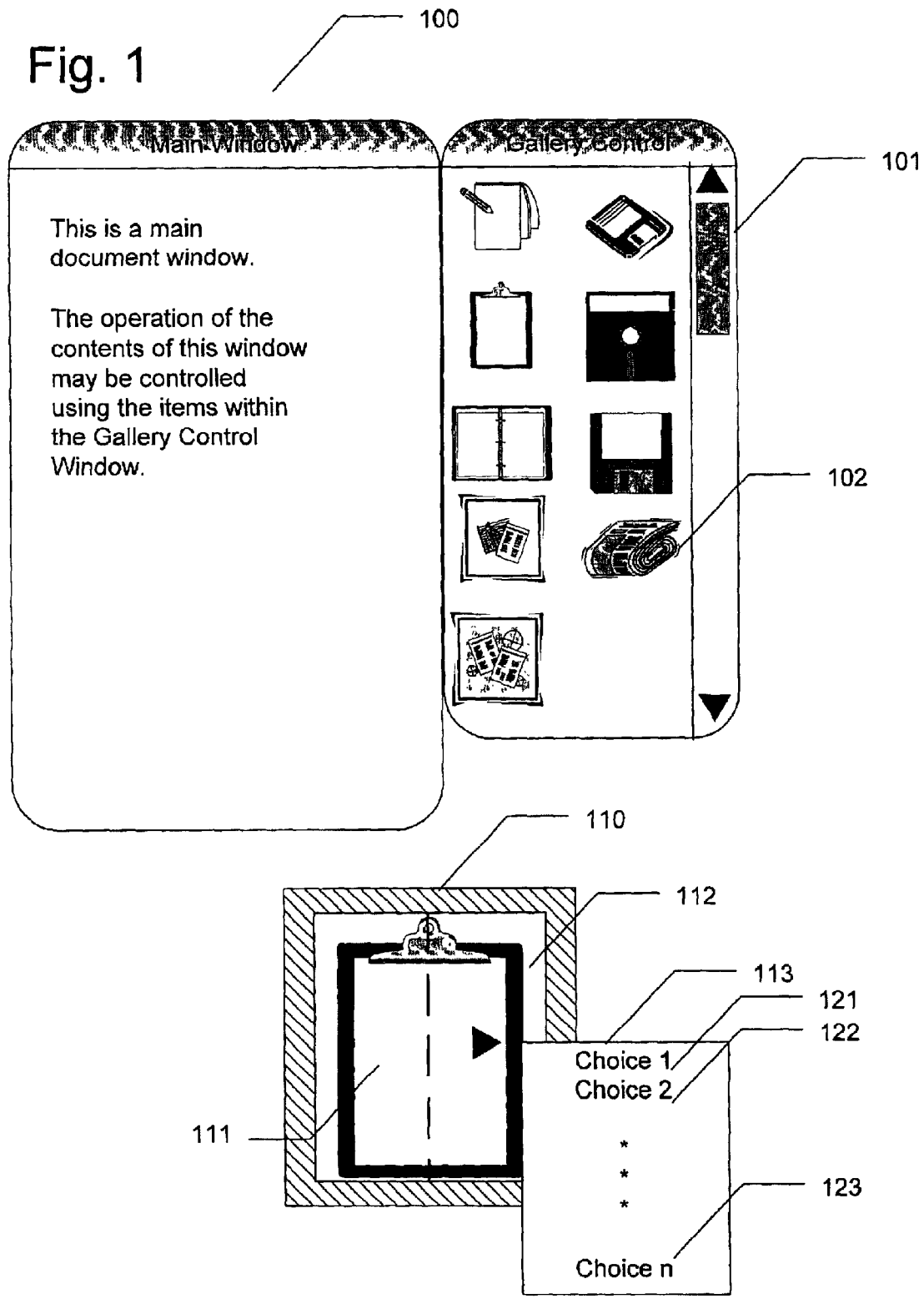
FIG. 1 illustrates a main application window and a gallery control window and a gallery control object according to one possible embodiment of the present invention.

FIG. 1 illustrates a main application window and a gallery control window and a gallery control object according to one possible embodiment of the present invention. Computing systems that utilize a graphical uses interface (GUI) typically display application programs within a main application window 100. A user interacts with the application program by interacting with and manipulating objects and items within this main application window 100. In an exemplary embodiment the object and items within this main application window include text, graphical, multimedia, and similar data objects that are created, edited, manipulated, and used within an application window. One skilled in the art will recognize that the present invention of providing controls that alter or set a property on a data item and object allows properties to be set and manipulated regardless of the type of data item or object. The only requirement upon the controls is that the control possess the processing modules needed to manipulate the property as it applies to the types of data supported by the control within a given application program.

In addition to the main application wind low 100, a gallery control window 101 provides a user with a scrollable window that contains one or more gallery control objects 102. A user generates a mouse-click upon these gallery control objects 102 in order to cause a change to a control associated with an object within the main application window 100.

A gallery control object 102 includes a plurality of components as illustrated in FIG. 1. The gallery control object 102 is constructed using a rich content icon having a selection portion 111 and a properties portion 112 that is surrounded by a status indication 110. A pop-up menu 113 containing one or more menu items 121–123 is associated with the properties portion 112 of the icon. In an exemplary embodiment, the pop-up menu is presented to a user when the user moves a mouse cursor over the properties portion 112 of the icon. If a user places the mouse cursor over top of one of the menu items 121–123, the menu item 122 is highlighted. If the user generates a mouse click upon one of the menu items, a set of instructions and related processing is performed that relates to a property or use of the gallery control item 102.

The rich content icon provides a visual depiction that is associated with feature or property being implemented using the particular gallery control object. In the example embodiment shown in FIG. 1, the rich content icons are graphical objects containing pictures. These objects may be either black and white oil color objects. Similarly, these objects may include formatted text that is rendered to fill the rich content icon. Text may be used within the rich content icon to illustrate formatting of text found within the main application window 100 using a particular combination of font formatting properties. As such, a user may see the likely result of selecting a particular gallery control object that controls the formatting of text within the main application window 100 from the contents of the rich content icon that renders text using its formatting properties.

The rich content icons may also contain photograph thumbnail images, video and similar multimedia data, and any other data that may be used to represent an icon. One skilled in the art will recognize that the use of text and graphical icons as described above is only one possible embodiment for the invention as recited within the attached claims.

When an item in the gallery control ha focus through either having the mouse hover over it, or via the keyboard, a menu dropdown arrow is shown. When the item does not have focus, no arrow appears, allowing the user to see more of the rich content displayed for that item. If the user's mouse hovers over the menu dropdown arrow, the arrow is displayed in a deeper intensity using the Windows default selection color to indicate that the dropdown arrow is active and that a menu will appear if the user left-clicks this area with the mouse.

In other possible embodiments, menu items 121–123 are represented using text items that describe the function or property to be presented to a user when a particular menu item 121–123 is selected. The particular menu item 122 that is to be selected may be displayed in a different manner, such as reverse video or a different color from the other menu items 121, 123 in the list as to distinguish which of the menu items 121–123 is being selected. Additionally, the pop-up menu 113 may be located to the left and right of the gallery control object 110 as well as above and below the gallery control object 110 without deviating from the spirit and scope of the present invention as recited within the attached claims.

Throughout the remaining description of various gallery controls, example of these gallery controls are presented as being constructed as a collection of gallery control objects within a gallery control window. In these example embodiments, these gallery control windows 101 are presented as a separate window from the main application window 100 containing a listbox having the user interface characteristics as discussed herein as simply an example embodiment. One skilled in the art will recognize that any list of items presented within any listbox that is presented to a user to selection and modification may be constructed as part of a separate window and as part of any pop-up listbox to be within the spirit and scope of the present invention as recited within the attached claims.

Figure 2:
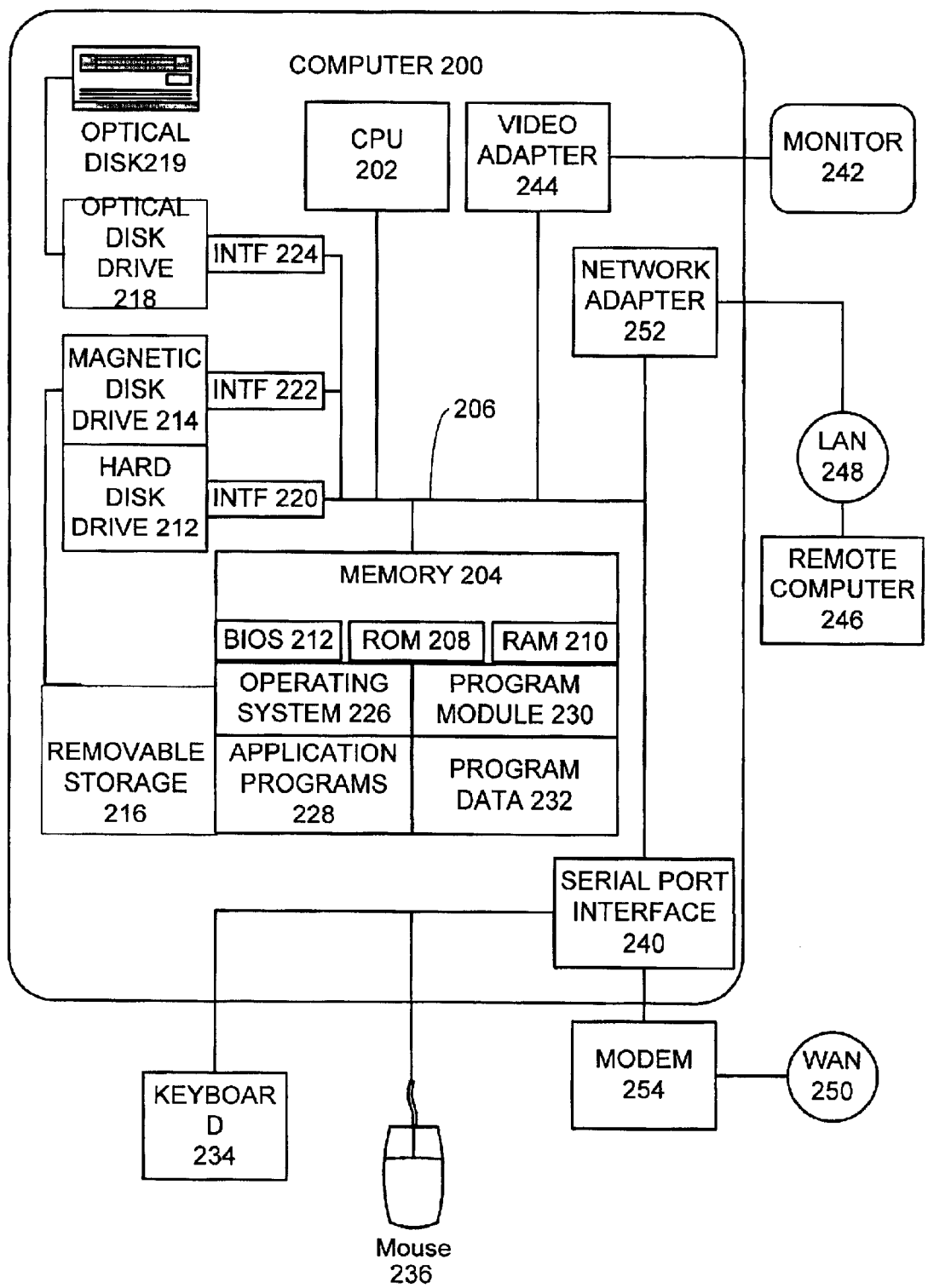
FIG. 2 illustrates a general purpose computing system for use in implementing as one or more computing embodiments of the present invention.

With reference to FIG. 2, an exemplary system for implementing the invention includes a general-purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the personal computer 200, is stored in ROM 208.

The personal computer 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, personal computers typically include other peripheral output devices (not shown), such as speakers and printers.

The personal computer 200 may operate in a networked environment using logical connections to one or more remote computers, such as a remote computer 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

FIG. 3 illustrates a pair of gallery control objects having focus property and having a selection property according to another embodiment of the present invention. Each of these two gallery control objects 301–302 possess the various components discussed above in reference to FIG. 1. These components include a selection portion of the icon 302, 312, a properties portion of the icon 303, 313, and a pop-up menu 304, 314. The size and location of the selection portion 302, 312 and the properties section 303, 313 of the icon may be changed to permit an emphasis upon one of the two portions without deviating from the present invention as recited within the claims. For example, the selection portion 302, 312 may constitute all of the area of an icon except a small area that encompasses a pop-up menu arrow 306, 316 when the gallery control is expected to predominantly select gallery control objects rather than change their properties. In this example, the corresponding properties portion 303, 313 would be the area around and including the pop-up menu arrow 306, 316. Of course, a gallery control window that expects properties of gallery control objects to be modified more than the objects are selected may construct the area for each of these portions of the icon in a different manner without deviating from the spirit and scope of the present invention as recited within the attached claims. In addition, these gallery control objects 301–302 contain a status indication 305, 315 that indicates if the gallery control object possesses a selection property, a focus property, or neither of these properties.

In order to understand the use of the gallery control object, the distinction between the focus property and the selection property is needed. Gallery control objects typically operate upon one of several situations within the main application window 100. First, the gallery control object may operate upon the entire contents of the main application window 100. This may correspond to operating upon the entire contents of a file. Within a word processing application, the entire main application window would correspond to the entire document. When an application possesses more than one main window, such as a word processing application that possesses a main test window, a header/footer window, a comments window, and a footnotes/ endnotes window, the gallery control object may also apply to each of these windows, or possibly a subset of all windows, such as a currently active window.

Next, the gallery control object 301, 302 may operate upon only a portion of the contents of a window. Typically, this portion its operated by a user selecting the portion of the window to which the gallery control object is to be applied. Of course, one skilled in the art will recognize that windows that have organizational structures such as sections, pages, paragraphs, sentences, words and similar areas of organized content may be used as the portion of the main application window that is to be affected by the application of the gallery control object 301 without deviating from the spirit and scope of the invention recited within the attached claims. In a word processing application, the portion of a main application window 100 to be selected is typically highlighted to visually distinguish the selected items and text from the non-selected portions of the main application window. The application of the gallery control object 301 will apply only to the selected portion of the main application window 301.

Finally, gallery control objects may also operate upon an insertion point placed within the main application window 100. An insertion point indicates a place within a main application window 100 where items are to be placed when inserted into the window 100. For example, an insertion point in a word processing application is the location within the window 100 where text will be added when a user types on an input device. The gallery control object 301 operates upon the insertion point, in the same way it works upon the above described portions of the window, except that the changes made to the insertion point apply only to items inserted into the window at the insertion point after the gallery control object 301 has been applied. The gallery control may also be used to insert content into the document at the insertion point (ClipArt Gallery, Office Clipboard) In the word processing example above, the application of a text formatting gallery control object 301 to an insertion point will change the format for the text to be inserted at the insertion point to correspond to the formatting set by the gallery control object 301.

Another common use for gallery controls is to create or open an entirely different document rather than operate upon a portion or all of an existing document contained within an open main application window. For example, gallery controls that provide "Search" and "Crash Recovery" open other documents in new main application windows rather than change selected portions of an open window. The "Search TaskPane" allows a user to search for such things as files, email messages or web pages based on their title, contents or other properties. It presents a list of found items in a gallery control with options such as open, open as template, copy link to clipboard or view properties. The "Crash Recovery TaskPane" contains a gallery control listing documents in use at the time of a crash. These documents can be opened, saved, or deleted via the context menu.

The Focus Property for a gallery control object 302 indicates the identity of a gallery control object 302 whose individual properties are being modified without having the changes applied to items within the main application window. A gallery control object 302 having focus corresponds to a gallery control object that itself is being edited in some fashion. Using the word processing example, a gallery control window 101 may contain a set of predefined text formatting setting. The settings for each gallery control object 301 may include a font type, a font size, one or more font formatting settings for underlining, bold, and italicized text, and similar formatting settings. When a particular gallery control object 301 is selected with a mouse click upon the selection portion 302 of the control 301, all of these pre-defined settings are applied to the selected portion of the main application window.

If a user desires to modify, copy, or delete one of these gallery control objects 301, the gallery control object 301 being modified, copied or deleted is given a focus property to indicate that the internal properties and settings for the gallery control object are being modified. The corresponding status indication 305 is given to the gallery control object 301 while the object has the focus property. Once the gallery control object 301 has been placed into its desired state, a user may select the gallery control object 301 using its selection portion 302 if the modified version of the gallery control object 301 is to be applied to a selected portion of the main application window 100.

A gallery control object 302 has a selection property, and corresponding status indication 315, when the gallery control object 302 corresponds to a control that is currently applied to the portion of the main application window 100 that is currently selected. For the word processing example, the gallery control object 302 that corresponds to the formatting for the current insertion point will be given the selection property if no other item is selected. If a portion of a word processing window 100 is selected and highlighted, the gallery control object 302 corresponding to the formatting settings for the selected text will have and display an indication of the selection property.

The status indication 305, 315 provides a visual mechanism to provide status information regarding the focus and selection property to a user. In an exemplary embodiment, these indications are implemented using a border being drawn around the gallery control object 301, 302. When a gallery control object 301 possesses a selection property, the selection indication is a two pixel wide border in the Windows system selection color (typically blue). When a gallery control object 302 possesses a focus property, the selection indication is a one-pixel width border of the selection color. Of course, one skilled in the art will readily recognize that other color combinations, border patterns, and other visual displays of status for these two properties may be used without deviating from the spirit and scope of the present invention as recited within the attached claims.

One skilled in the art will recognize that the above formatting uses in word processing examples are illustrative of the operation of gallery control objects are recited within the attached claims. These gallery control object may be used in any control window that contains a plurality of settings. One skilled in the art will also recognize that the gallery control objects may not necessarily possess multiple properties that require editing as discussed above if only selection is needed. The need for multiple properties may vary from item to item within a single list.

Figure 4:
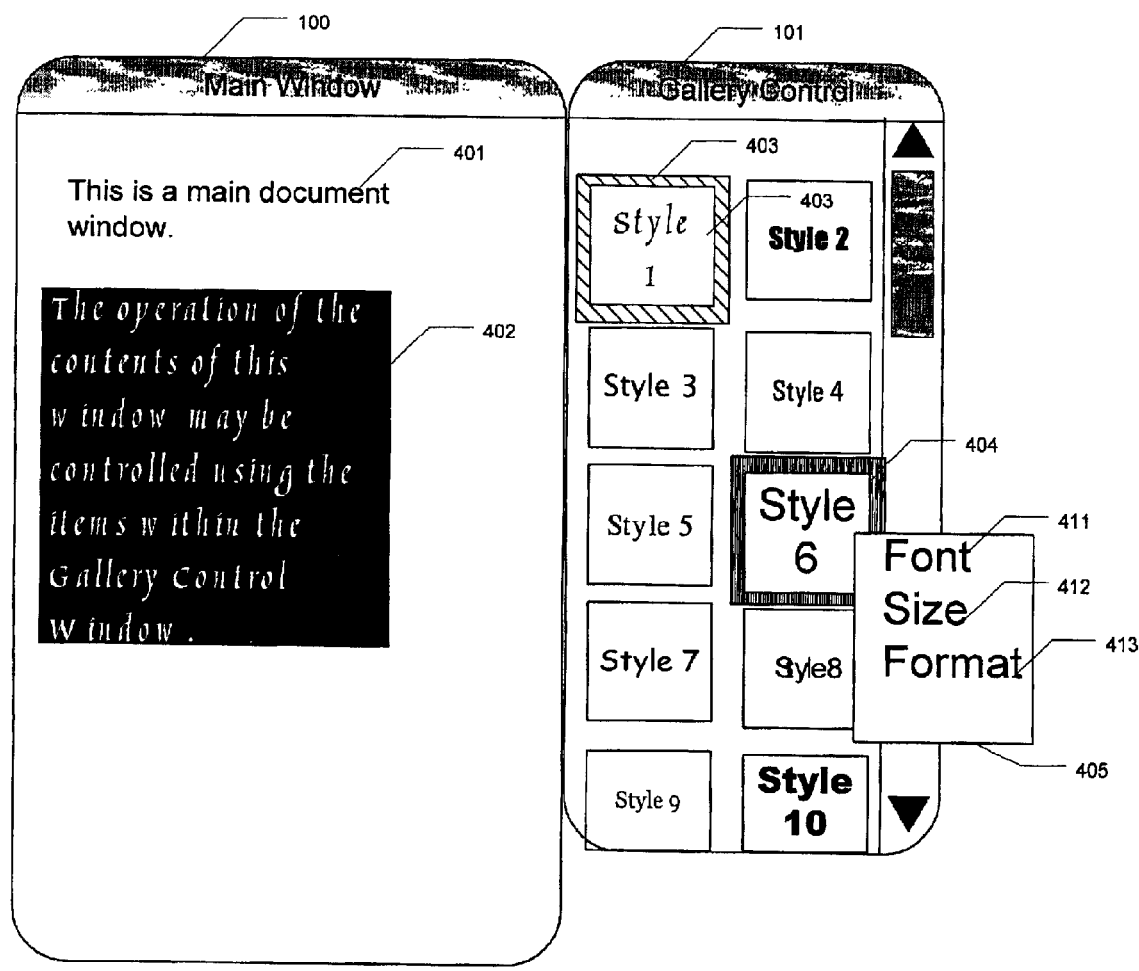
FIG. 4 illustrates a main application window and a gallery control window where a gallery control object applies a selection set by a gallery control object to a selection item within the main window according to yet another embodiment of the present invention.

FIG. 4 illustrates a main application window and a gallery control window where a gallery control object applies a selection set by a gallery control object to a selection item within the main window according to yet another embodiment of the present inventions. In this example embodiment, a word processing application is implemented using a main application window 100 and gallery control window 101. Within the main application window 100, two paragraphs 401–402 of text are shown with a second paragraph of text 402 being selected.

The gallery control window 101 is used to control the text formatting of the items within the main application window 100. Within the gallery control window 101, a plurality of text styles are shown as a set of gallery control objects 403–404. Two different paragraphs of text 401–402 are shown in the main application window 100. The second of these two paragraphs 402 is shown in reverse video to illustrate that its text has been selected and highlighted. When this text 402 is selected, the corresponding gallery control 403 that contains its formatting is marked as having the selection property. A second gallery control 404 is shown having a focus property with an activated pop-up menu 405 that presents a set of format-related menu choices 411 that are used to modify the properties of the gallery control having the focus property 404.

All of the text within the gallery controls are shown with the text rendered in its corresponding format that includes a font type, a font size and text format. The formatting for rich icon text within the gallery control having the selection property 403 matches the text formatting for the selected second paragraph 402. A user may change the formatting for this selected text 402 by simply clicking upon the selection portion of any gallery control.

Figure 5:
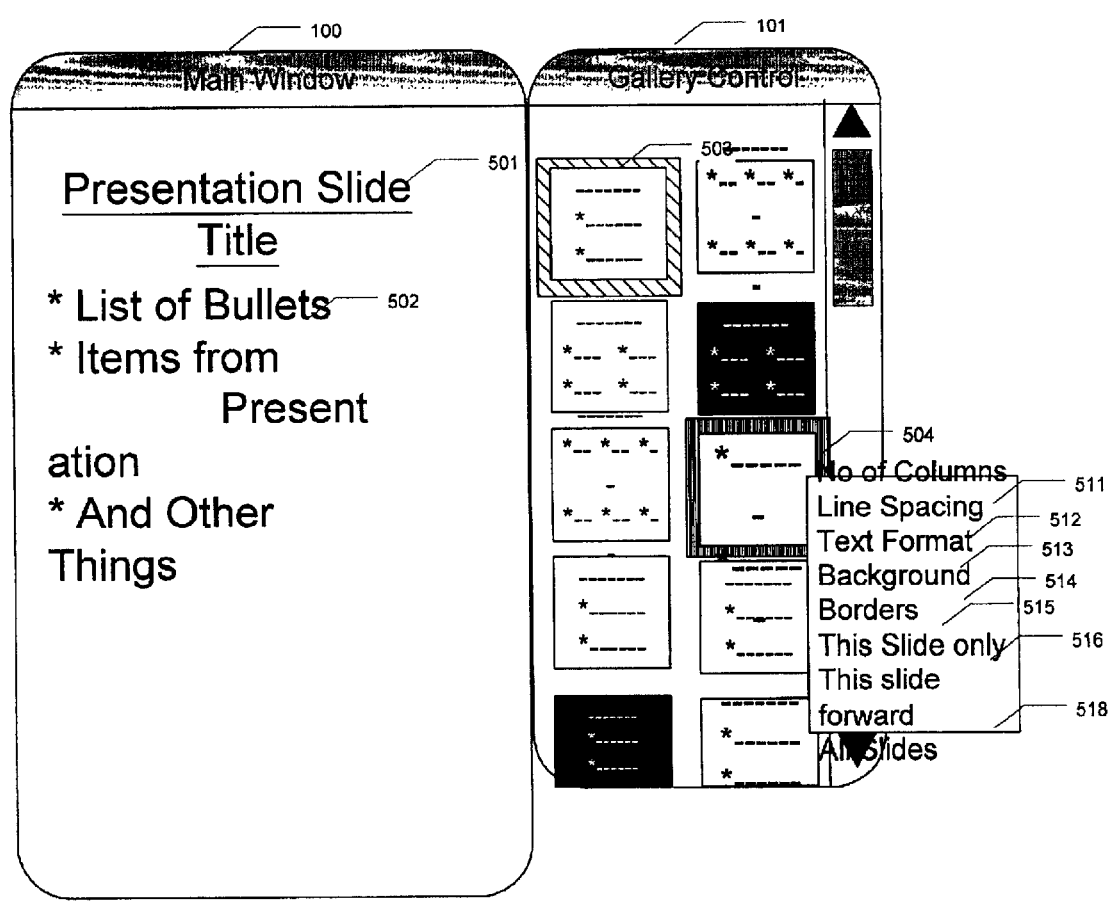
FIG. 5 illustrates another main application window and a gallery control window where another gallery control object applies a selection set by a gallery control object to a selection item within the main window according to yet another embodiment of the present invention.

FIG. 5 illustrates another main application window and a gallery control window where another gallery control object applies a selection set by a gallery control object to a selection item within the main window according to yet another embodiment of the present invention. This example embodiment of a gallery control illustrates a formatting operation for properties of presentation slides within a presentation editing and display application such as MICROSOFT POWERPOINT. The presentation slide within the main application window 100 includes a slide title 501 and a plurality of bullet items 502.

The gallery control window 101 includes a plurality of gallery control objects, including a gallery control object possessing the selection property 503 and a gallery control object possessing the focus property 504. As discussed above, the focus property allows a user to modify the properties associated with the gallery control object 504 before it is applied to the presentation slide within the main application window. The pop-up menu 505 includes a set of menu option 511–518 items that control the property settings 511–151 for this gallery control object 504 being modified as well as control how this gallery control object is to be applied 516–518 to the main application window 101. The various gallery control objects 503–504 include a rich content icon that renders a depiction of how the presentation slide will be created if the corresponding gallery control object is selected. These icons include a depiction of the text font and style, the slide background, any borders and other visual objects that may distinguish the various slide designs. As above, the gallery control window is a scrollable window that may contain any number of gallery control objects.

Figure 6:
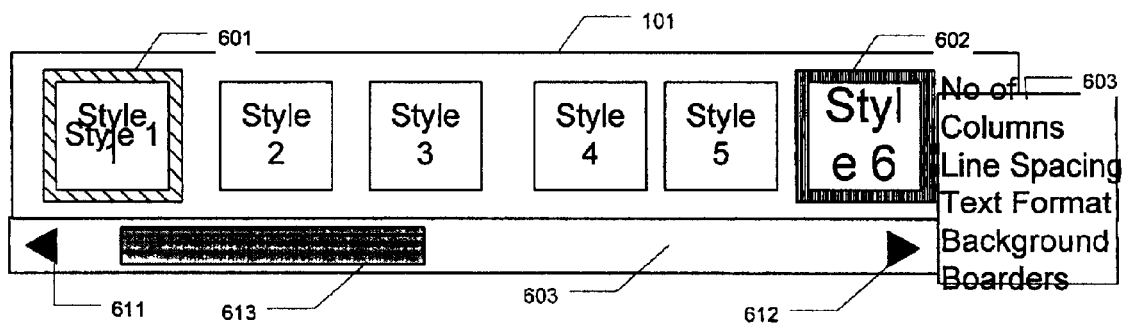
FIG. 6 illustrates a horizontal gallery control window according to another embodiment of the present invention.

FIG. 6 illustrates a horizontal gallery control window according to another embodiment of the present invention. In this embodiment, the gallery control window 101 is illustrated as a horizontal row of gallery control objects 601–602 within a scrollable window 101 that possesses standard window scrolling controls 611–613. The gallery control window may possess a gallery control object possessing the selection property 601 and the focus property 602 that may be modified using a pop-up window 603. In the example embodiment, only vertical scrolling window controls 611–613 are used. The gallery control objects are arranged to fill the available horizontal space within a gallery control window 101. If additional gallery control objects need to be presented, they are placed within a non-visible portion of a scrollable gallery control window 101. One skilled in the art will recognize that other window scrolling mechanisms, such as horizontal scrolling and two-dimensional scrolling windows, may be used without deviating from the presents invention as recited within the attached claims.

Figure 7:
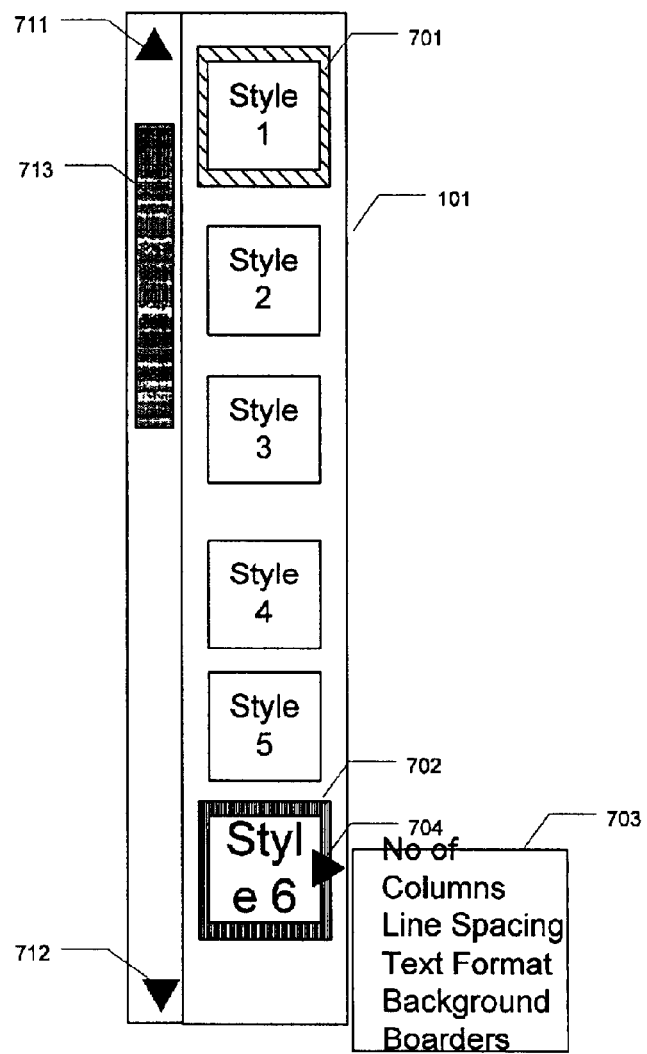
FIG. 7 illustrates a vertical gallery control window according to an embodiment of the present invention.

FIG. 7 illustrates a vertical gallery control window according to an embodiment of the present invention. In this alternate embodiments the gallery control window 101 is illustrated as a horizontal row of gallery control objects 701–702 within a scrollable window 101 that possesses standard window scrolling controls 711–713. The gallery control window may possess a gallery control object possessing the selection property 701 and the focus property 702 that may be modified using a pop-up window 703.

Figure 8:
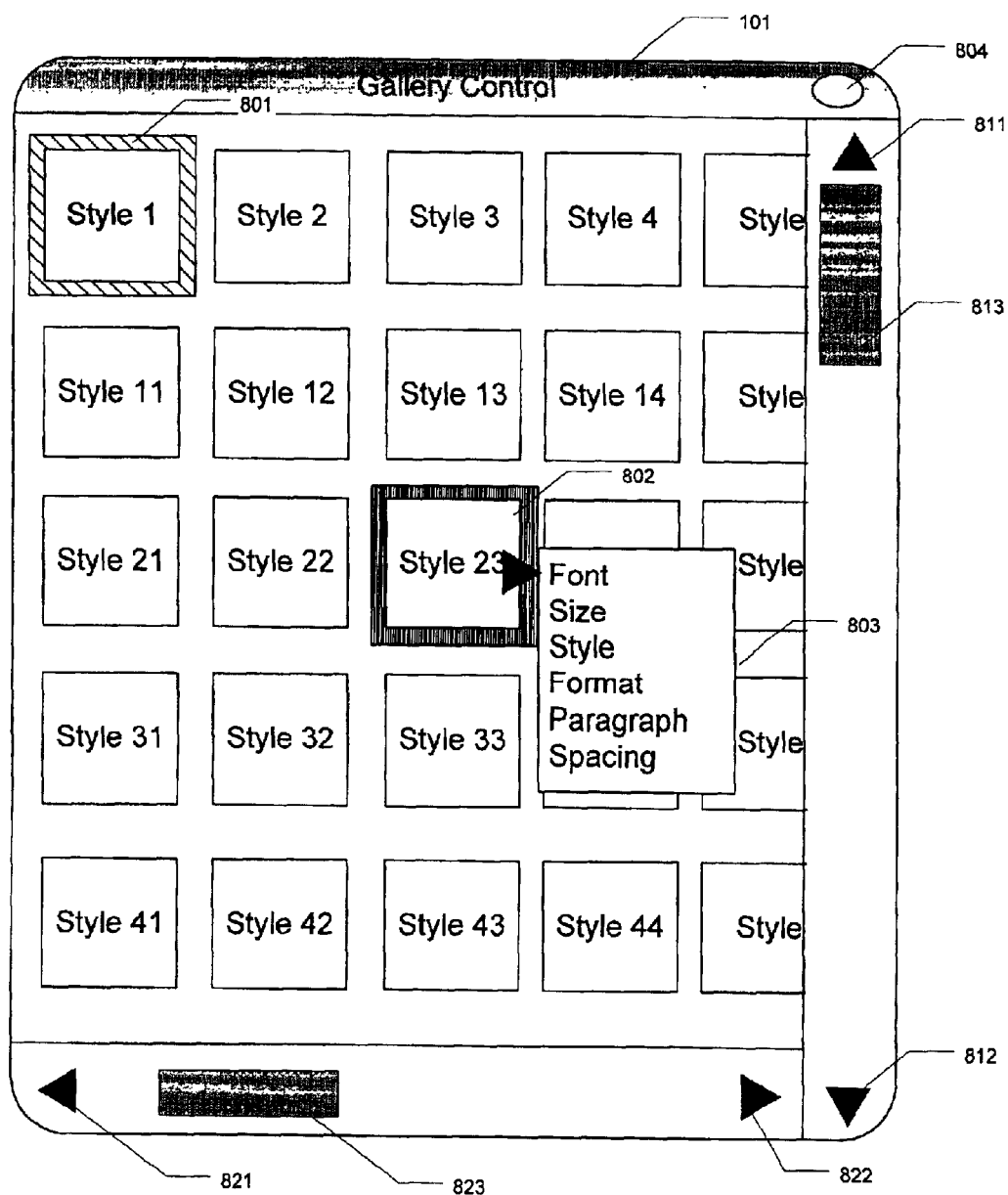
FIG. 8 illustrates a two-dimensional array of gallery control objects within a gallery control window according to yet another example embodiment of the present invention.

FIG. 8 illustrates a two-dimensional array of gallery control objects within a gallery control window according to yet another example embodiment of the present invention. In this additional embodiment, the gallery control window 101 is illustrated as a two dimensional array of gallery controls 101 containing a plurality of horizontal rows of gallery control objects 801–802 within a scrollable widow 101. The gallery control window that possesses standard window scrolling controls if the vertical direction 811–813. The gallery control window may possess a gallery control object possessing the selection property 801 and the focus property 802. A gallery control object with the focus may be modified using a pop-up window 803 by clicking on the properties portion of the object 303 or a keyboard shortcut.

Like all windows within a windowing graphical user interface such as one found within a computer operating system offered by MICROSOFT in its WINDOWS like of products or offered by APPLE COMPUTER in its MAC OS line of products, a gallery control window 101 may be scaled in size by clicking and dragging an edge of the window to change the dimensions of the window. As the size of the window changes, the contents of the window are arranged to fill the available space with additional items located within a portion of the window that is viewed using the scrolling controls. A horizontal gallery control as shown in FIG. 6 may be turned into either a vertical gallery control shown in FIG. 7 or a 2D gallery control of FIG. 8 by simply changing the dimensions of the gallery control window. The organization of the gallery control window is made by attempting to fill the available window with gallery control objects. If space allows multiple rows or multiple columns of gallery control objects, the gallery control window 101 will be rendered as a 2D array shown in FIG. 8.

Typically, the gallery control window 1101 is a window that is smaller than the main application window 100 as a user is expected lo perform operations upon items within the main application window 100. However, a user may wish to expand the size of the gallery control window to include more gallery object in order to allow more objects to be visible at a given time. As such, in some embodiments, a fly-out button 804 may be included within the gallery control window that when a mouse click is generated on the button, the gallery control window is quickly expanded to a large size in both directions. The fly out button may expand the gallery control window 101 to a larger fixed size that is configurable by the user, may expand the gallery control window a pre-determined percentage or multiples of its current size, and may expand the gallery control window 101 to a previously user-defined large size. When a mouse click is generated upon the fly-out button a second time, the gallery control window returns to its prior, small size.

Figure 9:
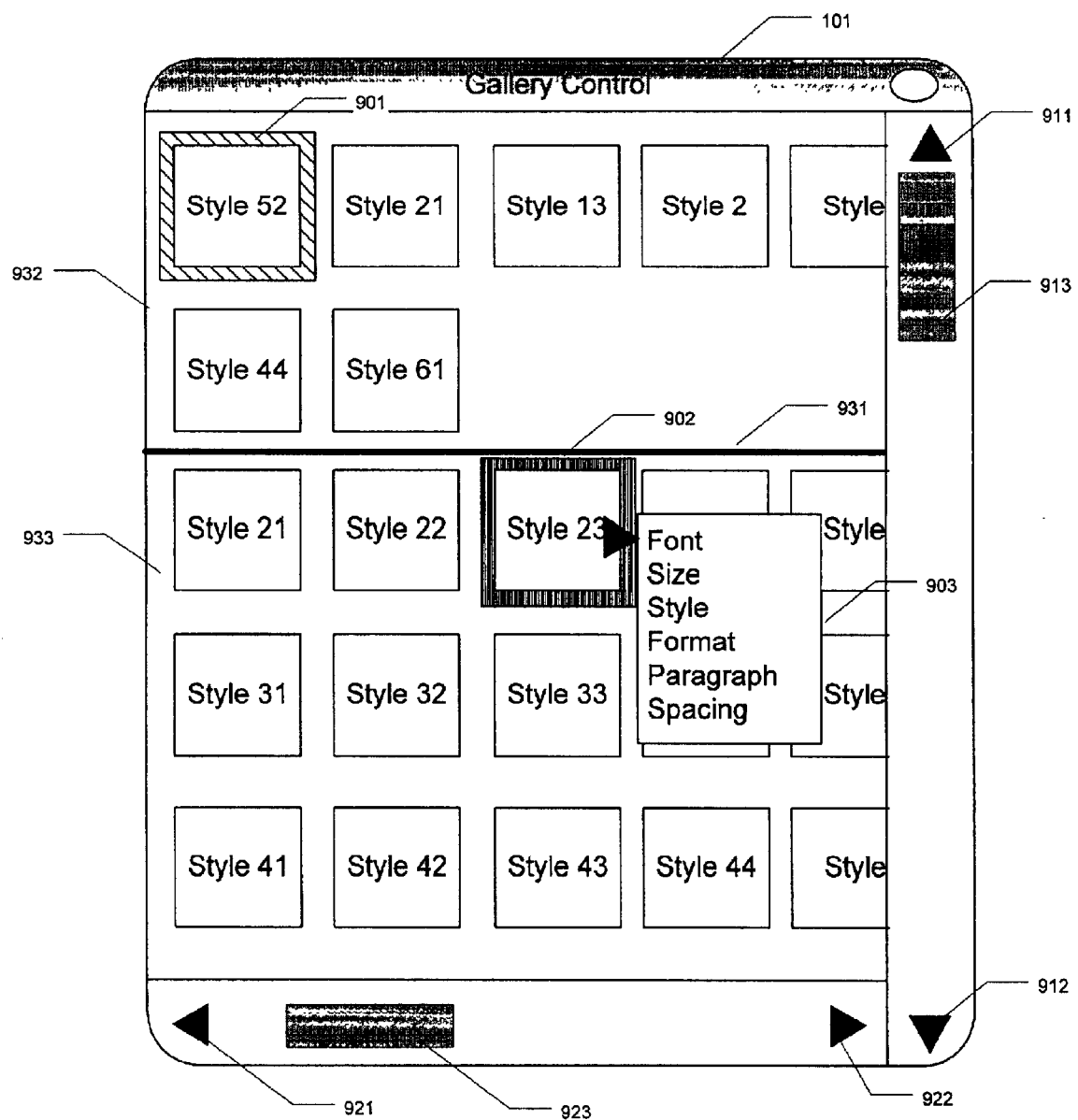
FIG. 9 illustrates a gallery control window containing a most-recently used list according to another embodiment of the present invention.

FIG. 9 illustrates a gallery control window containing a most-recently used list according to another embodiment of the present invention. In this additional embodiment, the gallery control window 101 is again illustrated as a two dimensional array of gallery controls 101 containing a plurality of horizontal rows or gallery control objects 901–902 within a scrollable window 101. The gallery control window that possesses standard window scrolling controls in the vertical direction 911–913. The gallery control window may possess a gallery control object possessing the selection property 901 and the focus property 902 that may be modified using a pop-up window 903.

The gallery control window 101, however, is divided into two parts: an MRU portion (most recently-used) 932 and a main gallery portion 933. These two portions 932–933 of the gallery control window 101 are separated by a MRU dividing line 931 that provides a visual and spatial separation from the two portions of the window 101. When a gallery control object is selected within the main gallery portion 933 for application to one or more items in the main application window 100, the selected item is added to the MRU portion 932. The list of items in the MRU portion may be presented in its own order, including alphabetical by name, an increasing or decreasing list by date of last use, or any manner in which the items are to be organized. The list of items within the main gallery portion 933 includes all available gallery control objects organized in any manner as well. The gallery control objects in the MRU portion 932 will also appear, along with any indication of both the selection property and the focus property, in the main gallery portion 933. The use of the window scrolling controls 911–913 may cause the entire contents of the gallery control window 101 to scroll. As such, the MRU portion 932 may be located within a non-visible portion of the scrolled gallery control window. One skilled in the art will recognize that the MRU portion 932 may be fixed in place within the main portion 933 using scrollable as well as the MRU portion 932 and the main portion 933 being separately scrollable without deviating from the spirit and scope of the present invention as recited within the attached claims.

While the use of the multiple portions 932–933 of the gallery control window 101 that are divided by a MRU dividing line 931 are being used to create a list of MRU gallery controls that are listed in a separate list in addition to a main list, one skilled in the are will recognize that this construct of concatenating multiple list of gallery control items separated by one or more dividing line may also be used on many other embodiments without deviating from the spirit and scope of the present invention as recited within the attached claims.

Figure 10:
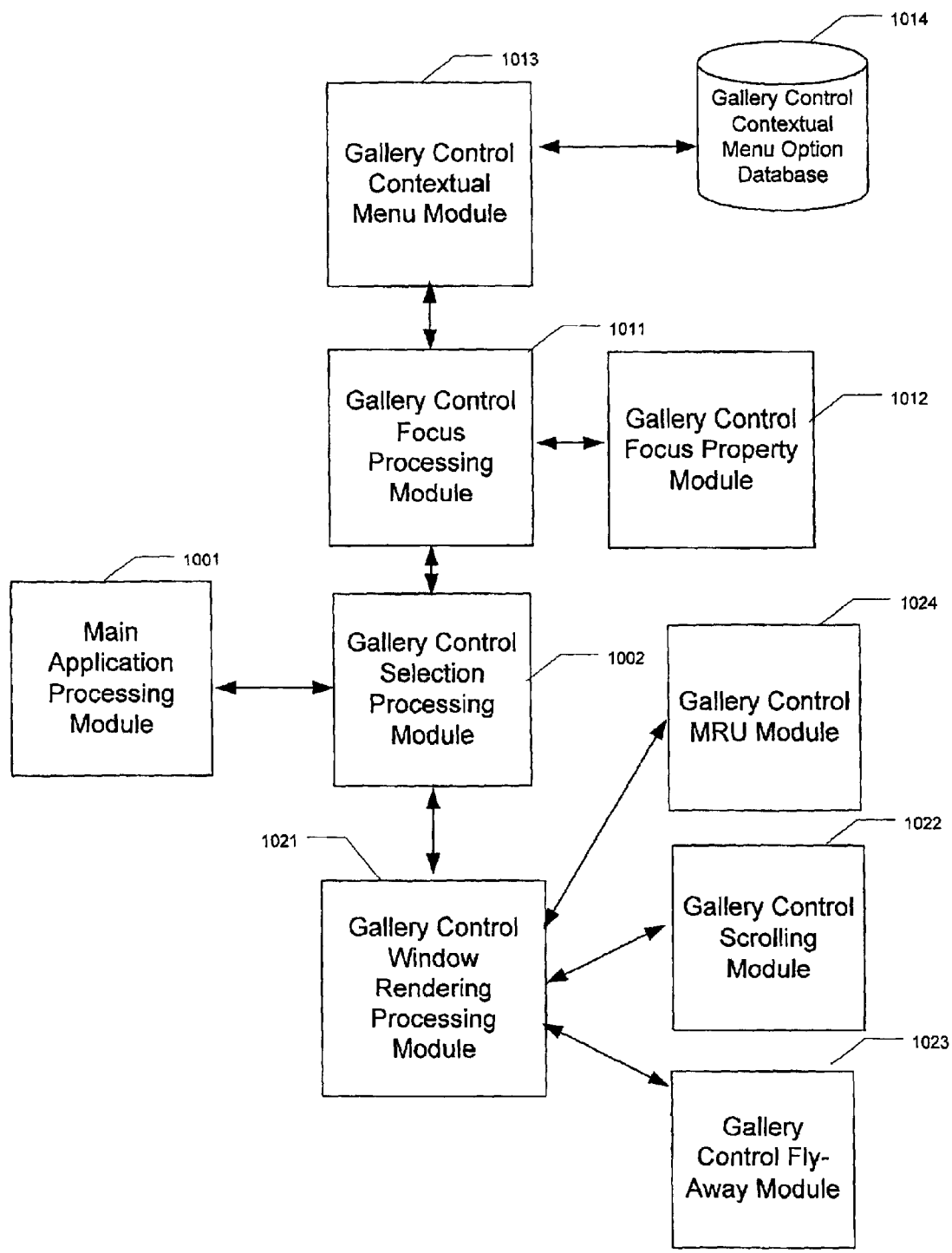
FIG. 10 illustrates a set of processing modules used to implement a gallery control according to an embodiment of the present invention.

FIG. 10 illustrates a set of processing modules used to implement a gallery control according to an embodiment of the present invention. The underlying application program implemented within the main application window 100 is controlled by processing performed by and within a main application processing module 1001. This module 1001 interacts with a gallery control window through a gallery control selection processing module 1002. The selection control module 1002 applies the properties of a gallery control object to the appropriate portions of the main application window 100 when a mouse click is generated on a selection portion of the corresponding gallery control object.

A gallery control object that has a focus property is controlled by the gallery control focus processing module 1011. The focus processing module 1011 interacts with a gallery control contextual menu module 1013 to obtain the appropriate pop-up menu and set of menu items for the gallery control object being modified. The pop-up menu and corresponding set of menu items for each gallery control object are provided by code specific to that control via control user callbacks. The existence of a menu and the number of items in the menu can vary for each item in the gallery control. Alternatively, all of the data needed to render the individual pop-up-menus containing the customizable lists of menu items may be located within a single gallery control contextual menu option database 1014 that is accessed to obtain the needed list of menu items when a pop-up menu is rendered.

The focus processing module 1011 interacts with a gallery control focus property module 1012 to obtain and modify the properties of the gallery control object in response to a user command applied to a pop-up menu item on the gallery control object. Once these properties are set in the module 1012, the properties may be applied to items within main application window 100 using the selection processing module 1002.

The selection processing module 1002 also interact with a gallery control window rendering module 1021 to generate the gallery control window as the above described arrangements of gallery control objects for use by a user. The window rendering module 1021 interacts with a gallery control MRU module 1024 to maintain a set of lists of gallery control objects to be presented to a user separately. The window rendering module 1021 interacts with a gallery scrolling module 1022 to process, mouse clicks that modifies the portion of the gallery control window that is presented to a user when the gallery control window 101 is scrollable. The window rendering module 1021 interacts with a gallery control fly-out module 1023 to process mouse clicks that modifies the portion of the gallery control window that is presented to a user when the user re-sizes the gallery control window.

Figure 11:
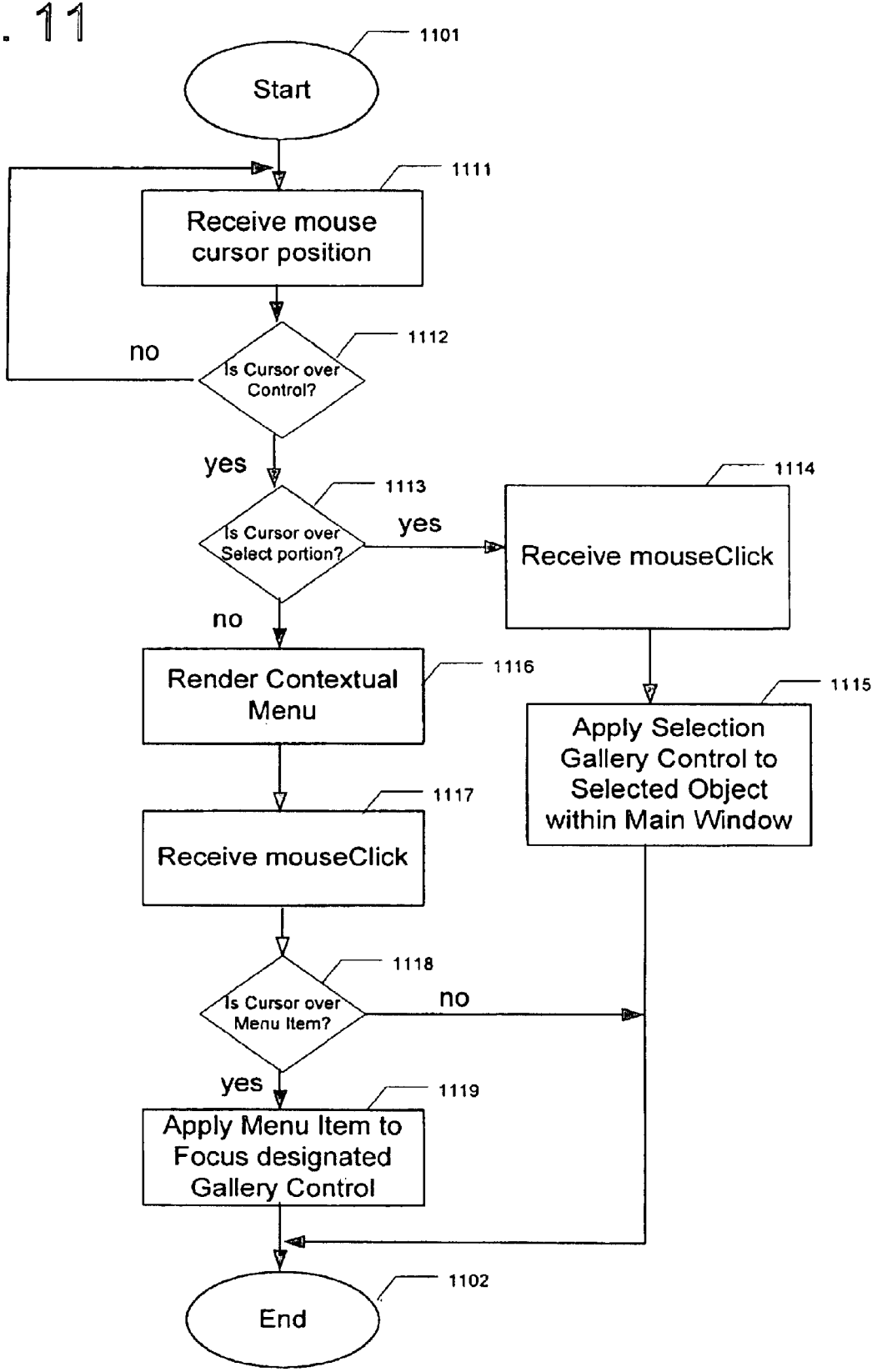
FIG. 11 illustrates an operational flow for the gallery control processing system according to an embodiment of the present invention.

FIG. 11 illustrates an operational flow for the gallery control processing system according to an embodiment of the present invention. The process begins 1101 and receives a mouse cursor position in module 1111. Test module 1112 determines if the mouse cursor position is located over a gallery control object. If test module 1112 determines that the mouse cursor position is not over a gallery control object, the processing returns to module 1111 to wait for the next mouse cursor position update. The processing remains in this loop until the mouse cursor position is located over a gallery control object. In the exemplary embodiment, the mouse cursor position is determined when a mouse move message is received from the OS. One skilled in the art will recognize that a process that repeatedly obtains the current mouse cursor position on an idle operation may be used as well without deviating from the spirit and scope of the present invention as recited within the claims attached herein. If the mouse cursor is over a gallery control item, that item has focus and is drawn that way. The next steps occur if an item is clicked.

When test module 1112 determines that the mouse cursor position is over a gallery control object, test module 1113 determines if the mouse cursor position is over a selection portion of a gallery control object. If test module 1113 determines that the mouse cursor position is over a selection portion of a gallery control object, the processing continues to module 1114 where the module 1114 obtains the mouse click and then applies the selected gallery control's properties to a corresponding selected item within the main application window 100 in module 1115. Once all of these control properties have been applied to the main application window item, the processing ends 1102.

If test module 1113 determines that the mouse cursor position is not over a selection portion of a gallery control object and thus is over a properties portion of the gallery control object, a contextual menu for the corresponding gallery control object is rendered onto the user's interface screen in module 1116. The process awaits a mouse click in module 1117 that indicates that a user is selecting a menu item from the contextual pop-up menu. Once the mouse click is received, test module 1118 determines if the mouse click is located upon a menu item from the pop-up menu. If the mouse click is determined by module 1118 not to be over a menu item, the processing ends 1102. Otherwise, processing associated with the menu item corresponding to the location of the mouse click is executed to change one ore more properties of the corresponding gallery control object for use when this gallery control object is selected. Once the menu item processing of module 1119 is completed, the processing ends 1102.

While the above embodiments of the present invention describe the interaction of a property control window from a main application window, one skilled in the are will recognize that a user interface control for selecting one or more options from a larger set of options where each of the options has a set one or more user selectable properties may actually encompass a large number of variations on the type of controls used. As long as the gallery controls used include the elements recited within the attached claims, the present invention to would be useable in the manner recited within the attached claims. It is to be understood that other embodiments may be utilized and operational changes may be made without departing from the scope of the present invention.

FIGS. 2 and 10 illustrates an example of a suitable operating environment 110 in which the invention may be implemented. The operating environment is only one example of a suitable operating environment 110 and is not intended to suggest any limitation as to the scope of use or functionality of the invention. Other well known computing systems, environments, and/or configurations that may be suitable for use with the invention include, but are not limited to, personal computers, server computers, held-held or laptop devices, multiprocessor systems, microprocessor-based systems, programmable consumer electronics, network PCs, minicomputers, mainframe computers, distributed computing environments that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

A computing system 200 typically includes at least some form of computer readable media. Computer readable media can be any available media that can be accessed by the computing system 200. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical steerage, magnetic cassettes, magnetic tape, magnetic disk storage or other magnetic storage devices, or any other medium which can be used to store the desired information and which can be accessed by the computing system 200.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

While the above embodiments of the present invention describe a personal computer processing system, one skilled in the art will recognize that the various distributed computing architectures may be used to implement the present invention as recited within the attached claims. It is to be understood that other embodiments may be utilized and operational changes may be made without departing from the scope of the present invention.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium or propagated signal containing a computer program for providing a user interface control to modify properties of items within a main application window.

What is claimed is:

1. A method for providing a user interface control to modify properties of items within a main application window, the method comprising:

rendering a list of control objects, at least one control objects in the list of control objects comprising a graphical icon having a selection portion and a properties portion with one or more controls;

selectively receiving a selection input upon the selection portion of the control object;

applying control properties of the control object to one of more selected items within the main application window in response to the selection input upon the selection portion of the control object;

selectively receiving a properties input upon the properties portion of the control object; and modifying one or more control object properties in response to the properties input upon the properties portion of the control object.

2. A method according to claim 1, wherein receiving the properties input further comprises:

rendering a pop-up menu, the pop-up menu having one or more items;

receiving a menu-item mouse click upon one of the one or more menu items;

determining an identify of a selected menu item from the location of the menu-item mouse click; and applying the selected item.

3. The method according to claim 2, wherein the pop-up menu is a contextual menu having menu items determined by a current state of the control object.

4. The method according to claim 1, wherein the list of control objects is rendered within a scrollable window.

5. The method according to claim 4, wherein the scrollable window containing the list of control objects is scrollable is a vertical direction.

6. The method according to claim 4, wherein the scrollable window is resizable.

7. The method according to claim 1, wherein the selection input and the properties input are both mouse clicks.

8. A method for providing a user interface control to modify properties of items within a main application window, the method comprising:

rendering a list of control objects, each of the control objects in the list of control objects comprising a graphical icon having a selection portion and a properties portion and one or more controls properties;

receiving a properties mouse click upon a properties portion of a first control object, the first control object being located within the rendered list of control object;

rendering a pop-up menu, the pop-up menu having one or more menu items;

receiving a menu-item mouse click upon one of the one or more menu items;

determining an identify of a selected menu item from the menu-item mouse click;

performing an action based upon the selected menu item;

receiving a selection mouse click upon a selection portion of the first control object; and applying the control properties of the control object;

wherein the pop-up menu is a contextual menu having menu items determined by a current state of the control object;

the list of control objects is rendered within a scrollable window;

the scrollable window containing the list of control objects is scrollable in a vertical direction; and the scrollable window is resizable.

9. A computer program data product readable by a computing system and encoding instructions for providing a user interface control to modify properties of items within a main application window, the method comprising:

rendered a list of control objects, each of the control objects in the list of control objects comprising a graphical icon having a selection portion and a properties portion and one or more control properties that affect one or more items within a the main application window;

receiving a selection mouse click upon a selection portion of a first control object;

applying control properties of the first control object to one or more selected items within the main application window in response to the selection mouse click upon the selection portion of the first control object;

receiving a properties mouse click upon a properties portion of the first control object; and modifying one or more control object properties in response to the properties mouse click upon the properties portion of the first control object.

10. The computer data product according to claim 9, wherein receiving the properties mouse click comprises:

rendering a pop-up menu, the pop-up menu having one or more menu items;

receiving a menu-item mouse click upon one of the one or more menu items;

determining an identify of a selected menu item from the location of the menu-item mouse click; and modifying one or more control object properties based upon the selected menu item.

11. The computer data product according to claim 10, wherein the pop-up item is a contextual menu having menu items determined by a current state of the first control object and the list of control objects is rendered within a scrollable window that may be resized.

12. The computer data product according to claim 11, wherein the scrollable window containing the list of control objects is scrollable in a vertical direction.

13. The computer data product according to claim 12, wherein the scrollable window is automatically resizable to an expanded size in response to a mouse click upon a fly-out input control.

14. The computer data product according to claim 13, wherein the computer program data product is a computer readable storage medium.

15. A computing system for providing a user interface control to modify properties of items within a main application window, the computing system comprising:

a main application window containing one or more application items, each of the application items having one or more control properties affecting a behavior of the application items;

a gallery control window containing a list of one or more control objects for modifying control properties of the application items located within the main application window, each of the control objects in the list of control objects comprising a graphical icon having a selection portion and a properties portion and one or more control properties that affect one or more items within the main application window;

a control object selection processing module for modifying one or more of the application items within the main application window based upon current values of control properties of a selected control object selected using a mouse click located upon a selection portion of the selected control object; and a control object focus processing module for modifying current values of control properties of a focus control object identified using a mouse click located upon a properties portion of the focus control object.

16. The computing system according to claim 15, wherein the control object focus module comprises:

a focus control processing module for processing mouse moves and clicks received from focus control objects;

a control focus property module for retrieving the current values of the control properties for the focus control object and modifying the control properties for the focus control object;

a control contextual menu module for providing a contextual list of control properties to be modified, a contents of the contextual list being determined based upon the current values of the control properties for the focus control object; and a control contextual menu option data store for maintaining contextual list data for use by the control contextual menu module.

17. The computing system according to claim 15, wherein the control object selection processing module comprises:
- a selection control processing module for processing mouse clicks received from selected control objects;
- a gallery control window rendering processing module for constructing a visual representation for the gallery control window;
- a gallery control scrolling window for controlling a size and position of a visible portion of the list of control objects;
- a gallery most-recently used module for maintaining a separate list of recently used control objects that is concatenated to the list of control objects before presentation to a user by the gallery control window processing module; and
- a gallery control fly-out module for controlling the size of a gallery control window as a multi-dimensional collection of control objects.

18. The computing system according to claim 17, wherein the gallery control window is automatically resizable to an expanded size in response to a mouse click upon a fly-out input control.

* * * * *

UNITED STATES PATENT AND TRADEMARK OFFICE
CERTIFICATE OF CORRECTION

PATENT NO. : 6,826,729 B1
DATED : November 30, 2004
INVENTOR(S) : Ronald Giesen

It is certified that error appears in the above-identified patent and that said Letters Patent is hereby corrected as shown below:

Column 3,
Line 31, delete "uses" and insert -- user --, therefore.

Column 4,
Line 8, delete "oil" and insert -- or --, therefore.

Column 6,
Line 66, delete "test" and insert -- text --, therefore.

Column 10,
Line 22, delete "if" and insert -- in --, therefore.
Line 48, delete "1101" and insert -- 101 --, therefore.

Column 11,
Line 34, delete "using" and insert -- being --, therefore.

Column 13,
Line 66, delete "steerage" and insert -- storage --, therefore.

Column 14,
Line 49, after "one" delete "of" and insert -- or --, therefore.
Line 59, delete "A" and insert -- The --, therefore.
Line 62, after "more" insert -- menu --.
Line 67, after "selected" insert -- menu --.

Column 15,
Line 8, delete "is" and insert -- in --.
Line 50, after "within" delete "a".

Column 16,
Line 9, delete "item" and insert -- menu --.

UNITED STATES PATENT AND TRADEMARK OFFICE
CERTIFICATE OF CORRECTION

PATENT NO.     : 6,826,729 B1
DATED          : November 30, 2004
INVENTOR(S)    : Ronald Giesen It is certified that error appears in the above-identified patent and that said Letters Patent is hereby corrected as shown below:

Column 18,
Line 3, insert -- rendering -- before "processing".

Signed and Sealed this

Twenty-fourth Day of May, 2005

JON W. DUDAS
*Director of the United States Patent and Trademark Office*